(12) United States Patent
Schwarze

(10) Patent No.: US 10,625,374 B2
(45) Date of Patent: Apr. 21, 2020

(54) METHOD FOR PRODUCING WORK PIECES HAVING A TAILORED MICROSTRUCTURE

(71) Applicant: SLM Solutions Group AG, Lübeck (DE)

(72) Inventor: Dieter Schwarze, Lübeck (DE)

(73) Assignee: SLM SOLUTIONS GROUP AG, Lübeck (DE)

(*) Notice: Subject to any disclaimer, the term of this patent is extended or adjusted under 35 U.S.C. 154(b) by 1041 days.

(21) Appl. No.: 14/771,155

(22) PCT Filed: Feb. 27, 2013

(86) PCT No.: PCT/EP2013/053946
§ 371 (c)(1),
(2) Date: Aug. 27, 2015

(87) PCT Pub. No.: WO2014/131444
PCT Pub. Date: Sep. 4, 2014

(65) Prior Publication Data
US 2016/0008922 A1   Jan. 14, 2016

(51) Int. Cl.
B23K 26/342 (2014.01)
B22F 3/105 (2006.01)
(Continued)

(52) U.S. Cl.
CPC .......... *B23K 26/342* (2015.10); *B22F 3/1055* (2013.01); *B23K 26/0006* (2013.01);
(Continued)

(58) Field of Classification Search
CPC ........... B22F 3/1055; B22F 2003/1056; B23K 26/0006; B23K 26/144; B23K 26/342; B29C 64/153
See application file for complete search history.

(56) References Cited

U.S. PATENT DOCUMENTS 5,106,010 A * 4/1992 Stueber .................... B23K 9/23
228/232
5,554,837 A * 9/1996 Goodwater .......... B23K 26/034
219/121.63
(Continued)

FOREIGN PATENT DOCUMENTS

CN  1476362 A  2/2004
CN  102549178 A  7/2012
(Continued)

OTHER PUBLICATIONS

International Search Report and Written Opinion, PCT/EP2013/053946, SLM Solutions GmbH, dated Nov. 18, 2013.
(Continued)

Primary Examiner — Geoffrey S Evans
(74) Attorney, Agent, or Firm — Taft Stettinius & Hollister LLP

(57) ABSTRACT

An apparatus (10) for producing three-dimensional work pieces comprises a carrier (16), a powder application device (14) for applying a raw material powder onto the carrier (16), an irradiation device (18) selectively irradiating electromagnetic or particle radiation onto the raw material powder applied onto the carrier (16), and a control unit (38) which is adapted to control the operation of the powder application device (14) and the irradiation device (18) in dependence of the crystallization behavior of the raw material powder, in order to tailor the microstructure of a work piece made of said raw material powder by a additive layer construction method.

14 Claims, 3 Drawing Sheets

Figure 1:
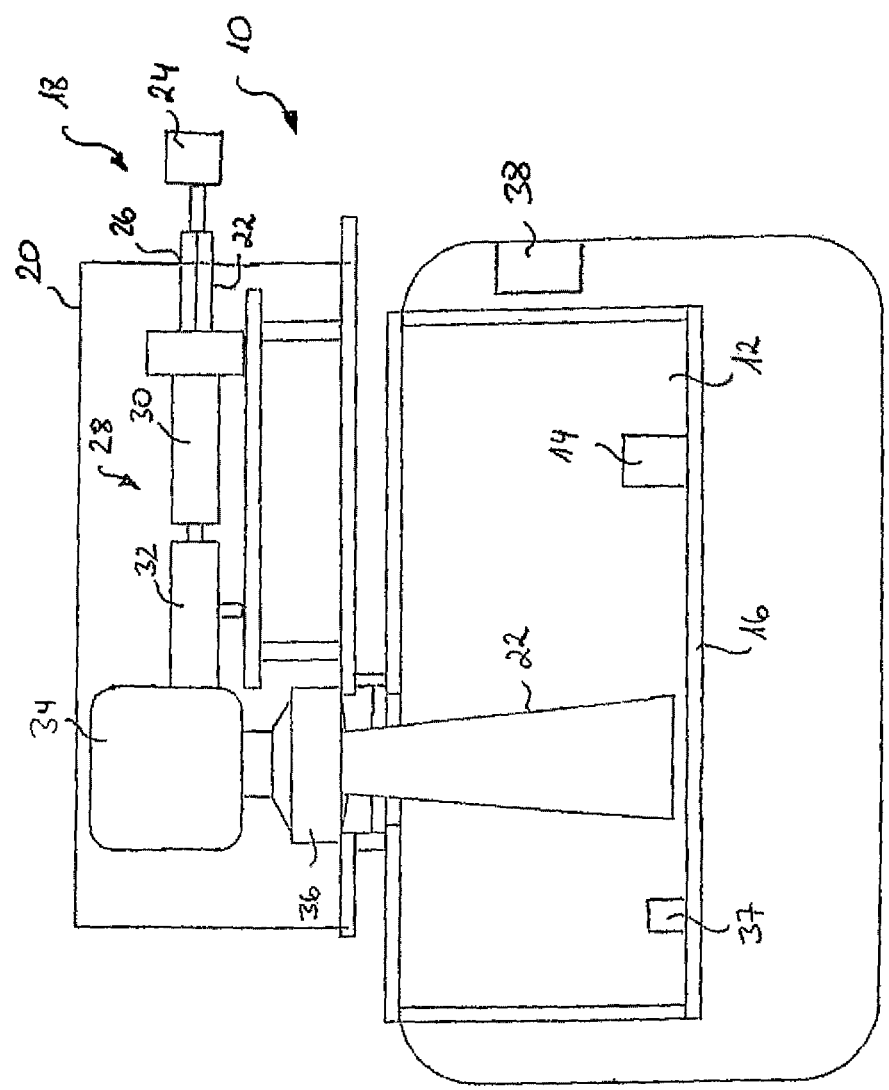

(51) Int. Cl.

| | | |
|---|---|---|
| *B29C 64/153* | (2017.01) | |
| *B23K 26/144* | (2014.01) | |
| *B23K 26/60* | (2014.01) | |
| *B23K 26/70* | (2014.01) | |
| *B23K 26/00* | (2014.01) | |
| *B23K 103/04* | (2006.01) | |
| *B33Y 10/00* | (2015.01) | |
| *B33Y 30/00* | (2015.01) | |

(52) U.S. Cl.
CPC .......... *B23K 26/144* (2015.10); *B23K 26/60* (2015.10); *B23K 26/70* (2015.10); *B29C 64/153* (2017.08); *B22F 2003/1056* (2013.01); *B23K 2103/05* (2018.08); *B33Y 10/00* (2014.12); *B33Y 30/00* (2014.12); *Y02P 10/295* (2015.11)

(56) References Cited

U.S. PATENT DOCUMENTS

| | | | | |
|---|---|---|---|---|
| 6,024,792 | A * | 2/2000 | Kurz .................. | B22F 3/1055 117/9 |
| 7,704,565 | B2 * | 4/2010 | Slaughter ............ | B22F 3/1055 355/53 |
| 2001/0014403 | A1 | 8/2001 | Brown et al. | |
| 2006/0054079 | A1 * | 3/2006 | Withey ................ | C30B 13/24 117/108 |
| 2010/0161102 | A1 * | 6/2010 | Mattes ................ | B22F 3/1055 700/108 |
| 2011/0042031 | A1 | 2/2011 | Furlong et al. | |
| 2011/0122381 | A1 * | 5/2011 | Hickerson .......... | B29C 35/0805 355/45 |
| 2012/0213659 | A1 | 8/2012 | Bayer et al. | |
| 2012/0267347 | A1 * | 10/2012 | Arjakine ............. | B05B 7/228 219/121.64 |
| 2013/0064706 | A1 * | 3/2013 | Schwarze ........... | B22F 3/1055 419/1 |
| 2013/0108460 | A1 * | 5/2013 | Szwedowicz ....... | B22F 3/1055 416/241 R |
| 2013/0112672 | A1 * | 5/2013 | Keremes ............. | B22F 3/1055 219/121.78 |
| 2013/0228302 | A1 * | 9/2013 | Rickenbacher ..... | C22C 19/056 164/492 |
| 2014/0163717 | A1 * | 6/2014 | Das .................... | B22F 3/1055 700/119 |
| 2014/0197139 | A1 * | 7/2014 | Burbaum ............ | B23K 26/34 219/76.12 |
| 2015/0090074 | A1 * | 4/2015 | Etter .................. | B22F 3/1055 219/76.14 |
| 2015/0108098 | A1 * | 4/2015 | Arjakine ............. | B23K 26/34 219/76.14 |

FOREIGN PATENT DOCUMENTS

| | | | |
|---|---|---|---|
| DE | 102009051479 | A1 | 5/2011 |
| EP | 0690780 | B1 | 7/1998 |
| EP | 0861927 | A1 | 9/1998 |
| EP | 1348781 | A1 | 10/2003 |
| EP | 1424158 | A1 | 6/2004 |
| EP | 1775104 | A1 | 4/2007 |
| EP | 1793979 | B1 | 2/2009 |
| EP | 2335848 | A1 | 6/2011 |
| JP | 2001-334581 | A * | 12/2001 |
| JP | 2012502178 | A | 1/2012 |
| WO | 2004039531 | A2 | 5/2004 |
| WO | 2010027317 | A1 | 3/2010 |
| WO | 2011020912 | A2 | 2/2011 |
| WO | WO-2011/066989 | A1 * | 6/2011 |

OTHER PUBLICATIONS

Notification of Reasons for Refusal, JP2015-559427, dated Aug. 23, 2016, with partial translation, 15 pages.

Notification of the Second Office Action, CN201380073909.3, dated Sep. 19, 2016, with English translation of the substantial part of the Second Office Action, 6 pages.

State Intellectual Property Office of P.R. China, First Office Action, CN201380073909.3, dated Mar. 28, 2016, 12 pages. See English Translation Attached.

Bansal R. et al., "Experimental and Theoretical Analysis of Scanning Laser Epitaxy Applied to Nickel-Based Superalloys," Woodruff School of Mechanical Engineering, Georgia Institute of Technology, Atlanta, GA 30332-0405, Jan. 2011 (8 pages).

Thijs et al., "Fine-Structured Aluminium Products with Controllable Texture by Selectrive Laser Melting of Pre-Alloyed AlSi10Mg Powder," Acta Materialia Inc. (2012), http://dx.doi.org/10.1016/j.actamat.2012.11.052, Accepted Nov. 30, 2012 (11 pages).

Hunt, J.D., "Steady State Columnar and Equiaxed Growth of Dendrites and Eutectic," Materials Science and Engineering, 65 (1984) pp. 75-83, Received Sep. 30, 1983 (9 pages).

Over, Christoph, Generative Fertigung von Bauteilen aus Werkzeugstahl X38CrMoV5-1, und titan TiAl6V4 mit Selective Laser Melting, PhD Thesis, RWTH Aachen (74 pages). Date of Oral Examination: Jun. 18, 2003. Please see partial English translation on pp. 136 to 139 (2 pages).

Ilschner, B. et al., Werkstoffwissesnschaften und Fertigungstechnik, Springer Verlag, 2010, Chapter 7, English Translated Title: Material Science and Production Technology, pp. 127-164 (39 pages). Please see Jul. 20, 2010 First Online Date and partial English translation (4 pages).

* cited by examiner

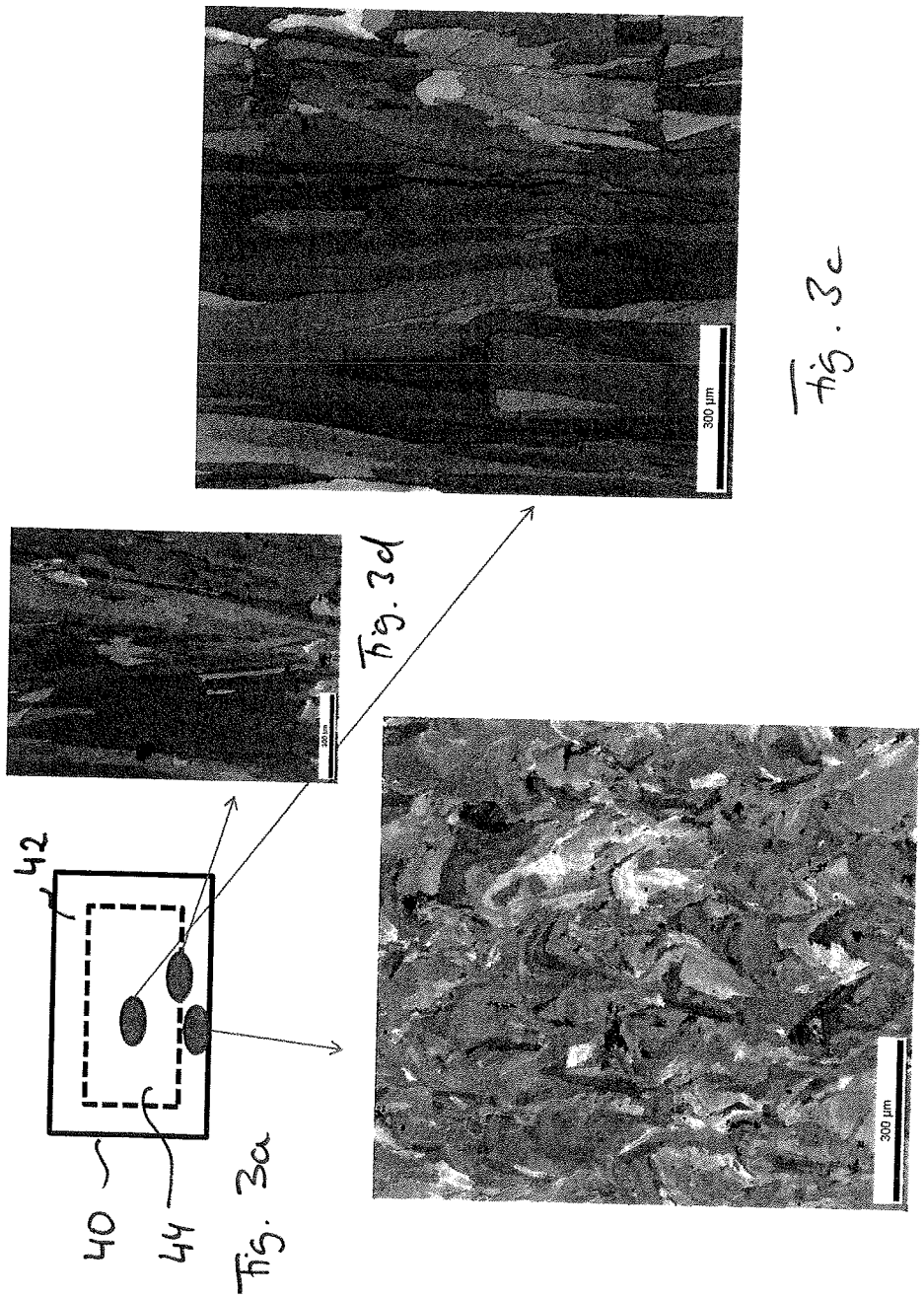

METHOD FOR PRODUCING WORK PIECES HAVING A TAILORED MICROSTRUCTURE

The present invention relates to an apparatus and a method for producing three-dimensional work pieces having a tailored microstructure by irradiating layers of a raw material powder with electromagnetic or particle radiation.

Selective laser melting or laser sintering is an additive layering process by which pulverulent, in particular metallic and/or ceramic raw materials can be processed to three-dimensional work pieces of complex shapes. To that end, a raw material powder layer is applied onto a carrier and subjected to laser radiation in a site-selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes, tools, replacement parts or medical prostheses, such as, for example, dental or orthopaedic prostheses, on the basis of CAD data.

An apparatus for producing moulded bodies from pulverulent raw materials by selective laser melting is described, for example, in EP 1 793 979 A1. The prior art apparatus comprises a process chamber which is maintained under a protective gas atmosphere and accommodates a plurality of carriers for the shaped bodies to be manufactured. A powder layer preparation system comprises a powder reservoir holder that can be moved to and fro across the carriers by means of a spindle drive. The process chamber is divided into a plurality of process chamber compartments by vertical partition walls. An irradiation device includes a laser, which provides laser radiation for a beam deflecting device via a fibre optical waveguide. The laser beam deflected by the beam deflecting device is focused by means of an F-theta lens on the powder layer last prepared on a particular carrier. If the powder materials being used in the individual process chamber compartments are different, the radiation intensity of the laser radiation can be adjusted for each compartment individually in order to take account of different material properties of the powders. In a corresponding manner, the irradiation wavelength can also be varied, and a spectrally adjustable laser or, optionally, a plurality of lasers of different emission wavelengths can be used for the irradiation of the powder layers in the different process chamber compartments.

EP 2 335 848 A1 discloses an apparatus for producing work pieces by irradiating powder layers of a raw material powder with laser radiation, the apparatus comprising an optical irradiation device which is equipped with optical components for guiding and focusing a beam path of a first laser beam, and an optical splitting and/or coupling unit. The optical splitting and/or coupling unit is designed to split the first laser beam into at least two laser sub-beams and/or to couple a second laser beam into the beam path of the first laser beam. For splitting the first laser beam into the at least two laser sub-beams, the optical splitting and/or coupling unit or the optical splitting unit of the optical splitting and/or coupling unit may comprise a diffractive optical element arranged, for example, in the beam path of the first laser beam and capable to produce a first beam profile (cross-sectional profile) of the first laser beam by splitting the first laser beam. A plurality of configurations are conceivable for both, the beam profile of each laser sub-beam and the overall beam profile of the first laser beam formed by all laser sub-beams.

For example, each of the laser sub-beams produced by means of the diffractive optical element may have a circular beam profile with Gaussian intensity distribution. In such a beam profile, the highest intensity of the beam is found at the centre of the circular laser sub-beam profile and decreases outwardly according to the Gaussian distribution. It is also conceivable for each laser sub-beam to have a ring-shaped beam profile (a so-called donut beam profile).

The thermal and mechanical properties of metallic work pieces typically strongly depend on the microstructure of the work pieces. For example, single crystalline metallic materials, in particular stainless steels or Ni, Co or Fe based superalloys, exhibit excellent mechanical, chemical and thermal properties even at elevated temperatures. These materials are therefore commonly used for manufacturing components subjected to high mechanical and thermal loads such as, for example, turbine blades or engine parts.

The invention therefore is directed to provide an apparatus and a method which allow the tailoring of the microstructure of three-dimensional work pieces produced by irradiating layers of a raw material powder with electromagnetic or particle radiation.

An apparatus for producing three-dimensional work pieces comprises a carrier and a powder application device for applying a raw material powder onto the carrier. In principle, the carrier may be rigidly fixed carrier. Preferably, however, the carrier is designed to be displaceable in vertical direction so that, with increasing construction height of a work piece, as it is built up in layers from the raw material powder, the carrier can be moved downwards in the vertical direction. The raw material powder preferably is a metallic powder, in particular a metal alloy powder, but may also be a ceramic powder or a powder containing different materials. The powder may have any suitable particle size or particle size distribution. It is, however, preferable to process powders of particle sizes <100 µm.

The apparatus further comprises an irradiation device for selectively irradiating electromagnetic or particle radiation onto the raw material powder applied onto the carrier. Hence, the raw material powder applied onto the carrier may be subjected to electromagnetic or particle radiation in a site-selective manner in dependence on the desired geometry of the work piece that is to be produced. The irradiation device preferably is adapted to irradiate radiation onto the raw material powder which causes a site-selective melting of the raw material powder particles.

Finally, the apparatus comprises a control unit which is adapted to control the operation of the powder application device and the irradiation device in dependence on the crystallization behavior of the raw material powder, in order to tailor the microstructure of a work piece made of said raw material powder by a additive layer construction method. Hence, the apparatus may be used for manufacturing work pieces having a desired microstructure. By tailoring the microstructure of the work pieces, work pieces having specific mechanical, thermal, electrical or chemical properties may be manufactured. For example, work pieces having a substantially single crystalline or directionally/dendritically solidified microstructure and thus exhibiting high mechanical, chemical and thermal resistance, in particular at elevated temperatures, may be obtained.

A "substantially single crystalline or directionally/dendritically solidified microstructure", in the context of the present application, may be a microstructure which is in fact single crystalline, i.e. does comprise any grain boundaries. The expression "substantially single crystalline or directionally/dendritically solidified microstructure" should, however, also cover a microstructure which does have grain boundaries between grains having preferred orientation, i.e. a microstructure wherein the grain boundaries extend substantially parallel to each other in a preferred direction. Such a microstructure typically is obtained by a directional solidification of metallic melts.

The crystallization behavior of a melt, in particular a metallic melt, may be described, for example, by the so-called v-G-diagram, wherein the solidification or crystal growth velocity v is plotted against the temperature gradient G, typically on a double logarithmic scale. A v-G-diagram may be measured or calculated for any desired material, as it is well known in the art and described, for example, in the publication by J. D. Hunt entitled "Steady State Columnar and Equiaxed Growth of Dendrites and Eutectic", Materials Science and Engineering, Vol. 65, 1984, pages 75-83. Within the v-G-diagram, different regions of v-G-combinations are associated with different microstructural properties of the solidified melt. For example, high solidification or crystal growth velocities and low temperature gradients lead to the development of a polycrystalline globulitic microstructure, whereas low solidification or crystal growth velocities in combination with (local) undercooling of the melt due to high temperature gradients result in the formation of dendrites and single crystals.

The control unit of the apparatus for producing three-dimensional work pieces thus is adapted to control the operation of the powder application device and the irradiation device in such a manner that, in dependence on the raw material powder type, a suitable combination of the solidification or crystal growth velocity and the temperature gradient occurring in the melt produced by irradiating the powder with electromagnetic or particle radiation is obtained in order to generate the desired microstructure, i.e. either a polycrystalline globulitic microstructure or a directionally solidified microstructure comprising substantially dendrites and/or single crystals.

The irradiation device may comprise at least one radiation source, in particular a laser source, and at least one optical unit for guiding and/or processing a radiation beam emitted by the radiation source. The radiation source may comprise a diode pumped Ytterbium fibre laser emitting laser light at a wavelength of approximately 1070 to 1080 nm. The optical unit may comprise optical elements such an object lens, in particular and f-theta lens, and a scanner unit, the scanner unit preferably comprising a diffractive optical element and a deflection mirror. For example, the irradiation device may be an irradiation device as described in EP 2 335 848 A1.

The control unit of the apparatus for producing three-dimensional work pieces preferably is adapted to control at least one of the radiation source and the optical unit so as to adjust at least one operating parameter of the radiation source and/or the optical unit in dependence on the crystallization behavior of the raw material powder, in order to tailor the microstructure of a work piece made of said raw material powder by a additive layer construction method. In other words, the control unit may be adapted to control the operation of the radiation source and/or the optical unit in such a manner that, in dependence on the raw material powder type, a suitable combination of the solidification or crystal growth velocity and the temperature gradient occurring in the melt produced by irradiating the powder with electromagnetic or particle radiation is obtained in order to generate the desired microstructure.

The operating parameters of the radiation source and/or the optical unit which may be controlled by means of the control unit may include, for example, a beam size, in particular a beam diameter, of a radiation beam irradiated onto the raw material powder applied onto the carrier and a beam profile of a radiation beam irradiated onto the raw material powder applied onto the carrier. For example, the beam size of the radiation beam may be increased under the control of the control unit in order to promote the occurrence of a low solidification or crystal growth velocity in combination with a high temperature gradient in the melt produced by irradiating the powder and to thus obtain a substantially single crystalline or directionally/dendritically solidified microstructure in the generated work piece. Preferably, the beam diameter of a radiation beam emitted by the radiation source and processed by the optical unit may be set to $\geq 200$ μm, in particular $\geq 500$ μm and specifically $\geq 750$ μm in order to obtain a substantially single crystalline or directionally/dendritically solidified microstructure in the generated work piece.

Additionally or alternatively thereto, it is conceivable to promote the occurrence of a low solidification or crystal growth velocity in combination with a high temperature gradient in the melt and thus the formation of a substantially single crystalline or directionally/dendritically solidified microstructure in the generated work piece by changing the beam profile from a circular beam profile with a Gaussian intensity distribution to a ring-shaped donut profile.

Further, the operating parameters of the radiation source and/or the optical unit which may be controlled by means of the control unit may include a scan speed and/or a scan pattern of a radiation beam irradiated onto the raw material powder applied onto the carrier. For example, the scan speed may be decreased under the control of the control unit in order to promote the occurrence of a low solidification or crystal growth velocity in combination with a high temperature gradient in the melt produced by irradiating the powder and to thus obtain a substantially single crystalline or directionally/dendritically solidified microstructure in the generated work piece. Preferably, the scan speed may be set to less than 1 m/s.

Additionally or alternatively thereto, it is conceivable to promote the occurrence of a low solidification or crystal growth velocity in combination with a high temperature gradient in the melt and thus the formation of a substantially single crystalline or directionally/dendritically solidified microstructure in the generated work piece by increasing the distance between hatches along which the radiation beam is guided over the powder surface. Preferably, the hatch distance may be set to less than 1 mm.

Finally, an output of the radiation source, in particular a laser power of a laser source, may be controlled by means of the control unit in such a manner that, in dependence on the raw material powder type, a suitable combination of the solidification or crystal growth velocity and the temperature gradient occurring in the melt produced by irradiating the powder is obtained in order to generate the desired microstructure. Specifically, the output of the radiation source may be increased under the control of the control unit in order to promote the occurrence of a low solidification or crystal growth velocity in combination with a high temperature gradient in the melt and thus the formation of a substantially single crystalline or directionally/dendritically solidified microstructure in the generated work piece. Preferably, the output of the radiation source may be set to less than 2000 W, in particular less than 1000 W.

The control unit may further be adapted to control the operation of the powder application device in such a manner that, in dependence on the raw material powder type, a suitable combination of the solidification or crystal growth velocity and the temperature gradient occurring in the melt produced by irradiating the powder with electromagnetic or particle radiation is obtained in order to generate the desired microstructure. In particular, the control unit may be adapted to control the operation of the powder application device so as to adjust a thickness of a raw material powder layer applied onto the carrier in dependence on the crystallization behavior of the raw material powder, in order to tailor the microstructure of a work piece made of said raw material powder by a additive layer construction method.

For example, the operation of the powder application device may be controlled so as increase the thickness of the raw material powder layer applied onto the carrier, if it is desired to promote the occurrence of a low solidification or crystal growth velocity in combination with a high temperature gradient in the melt and thus the formation of a substantially single crystalline or directionally/dendritically solidified microstructure in the generated work piece. Preferably, the thickness of the raw material powder layer applied onto the carrier may be set to range from 30 to 250 µm.

The apparatus for producing three-dimensional work pieces may further comprise a heating device for preheating the raw material powder prior to irradiating electromagnetic or particle radiation onto the raw material powder. The control unit may be adapted to control the heating device so as to adjust a preheating temperature of the raw material powder in dependence on the crystallization behavior of the raw material powder, in order to tailor the microstructure of a work piece made of said raw material powder by a additive layer construction method.

The melting point, the melting properties (for example the absence or presence of eutectic compositions in an alloy), the crystallographic structure, and further material properties of the material employed in pulverous form as the raw material for generating a work piece strongly influence the v-G-diagram and hence the combination of the solidification or crystal growth velocity and the temperature gradient occurring in the melt produced by irradiating the powder which is suitable to obtain a desired microstructure in the work piece. Consequently, the actual values of the operating parameters of the irradiation device, in particular the radiation source and the optical unit of the irradiation device, the powder application device and the heating device which have to be adjusted with the aid of the control unit in order to generate the desired microstructure in the work piece may vary significantly in dependence on the raw material powder type.

For example, it is easily conceivable that the operating parameters of the irradiation device, the powder application device and the heating device which have to be set by means of the control unit in order to generate a substantially single crystalline or directionally/dendritically solidified microstructure in a work piece made of an Aluminum alloy significantly differ from the operating parameters which have to be set by means of the control unit in order to generate a substantially single crystalline or directionally/dendritically solidified microstructure in a work piece made of steel or an Ni, Co or Fe based superalloy. Suitable value ranges, however, may be obtained, based on the teaching of this application by experimental work as it is common to be carried out by a person skilled in art.

The control unit of the apparatus for producing three-dimensional work pieces may further be adapted to control the operation of the powder application device and the irradiation device in dependence on the crystallization behavior of the raw material powder, in order to differently tailor the microstructure of a work piece made of said raw material powder by a additive layer construction method in different regions of the work piece. For example, the control unit may be adapted to control the operating parameters of a radiation source and/or an optical unit of the irradiation device and/or the operating parameters of the powder application device as described above differently in different regions of the work piece in order to obtain, for example, a polycrystalline globulitic microstructure in a first region and a directionally/dendritically solidified microstructure in a second region of the work piece.

Specifically, the control unit may be adapted to control the operation of the powder application device and the irradiation device, i.e., for example, the operating parameters of a radiation source and/or an optical unit of the irradiation device and/or the operating parameters of the powder application device in dependence on the crystallization behavior of the raw material powder, in order to obtain a work piece made of said raw material powder by a additive layer construction, the work piece having a substantially polycrystalline globulitic microstructure in an outer shell region and a substantially single crystalline or directionally/dendritically solidified microstructure in an inner core region.

A method for producing three-dimensional work pieces comprising the steps of applying a raw material powder onto the carrier by means of a powder application device, selectively irradiating electromagnetic or particle radiation onto the raw material powder applied onto the carrier by means of an irradiation device, and controlling the operation of the powder application device and the irradiation device by means of a control unit in dependence on the crystallization behavior of the raw material powder, in order to tailor the microstructure of a work piece made of said raw material powder by a additive layer construction method.

In the method for producing three-dimensional work pieces a radiation beam emitted by at least one radiation source of the irradiation device may be guided and/or processed by means of at least one optical unit of the irradiation device.

The control unit may control the radiation source and/or the optical unit so as to adjust at least one of a beam size of a radiation beam irradiated onto the raw material powder applied onto the carrier, a beam profile of a radiation beam irradiated onto the raw material powder applied onto the carrier, a scan speed of a radiation beam irradiated onto the raw material powder applied onto the carrier, a scan pattern of a radiation beam irradiated onto the raw material powder applied onto the carrier, and an output of the radiation source in dependence on the crystallization behavior of the raw material powder, in order to tailor the microstructure of a work piece made of said raw material powder by a additive layer construction method.

Further, the control unit may control the powder application device so as to adjust a thickness of a raw material powder layer applied onto the carrier in dependence on the crystallization behavior of the raw material powder, in order to tailor the microstructure of a work piece made of said raw material powder by a additive layer construction method.

The raw material powder, prior to irradiating electromagnetic or particle radiation onto the raw material powder, may be preheated by means of a heating device. The control unit may control the heating device so as to adjust a preheating temperature of the raw material powder in dependence on the crystallization behavior of the raw material powder, in order to tailor the microstructure of a work piece made of said raw material powder by a additive layer construction method.

The control unit may control the operation of the powder application device and the irradiation device in dependence on the crystallization behavior of the raw material powder, in order to differently tailor the microstructure of a work piece made of said raw material powder by a additive layer construction method in different regions of the work piece.

The control unit may control the operation of the powder application device and the irradiation device in dependence on the crystallization behavior of the raw material powder, in order to obtain a work piece made of said raw material powder by a additive layer construction, the work piece having a substantially polycrystalline globulitic microstructure in an outer shell region and a substantially single crystalline or directionally/dendritically solidified microstructure in an inner core region.

A work piece is manufactured by a method as described above. In order to determine whether a work piece is manufactured by a method as described above, conventional analysis techniques such as microscopy and in particular electron backscatter diffraction (EBSD) can be used. For example, the thickness of the powder layers irradiated with electromagnetic or particle radiation during production of the work piece by a additive layer construction method or the size of melting tracks generated in the powder during irradiating the powder (which allow conclusions regarding the beam diameter of the radiation source) may be determined by a person skilled in the art upon examining the work piece. The work piece may exhibit, at least in a region thereof, a substantially single crystalline or directionally/dendritically solidified microstructure. Preferably, the work piece exhibits a substantially polycrystalline globulitic microstructure in an outer shell region thereof and a substantially single crystalline or directionally/dendritically solidified microstructure in an inner core region thereof.

Figure 2:
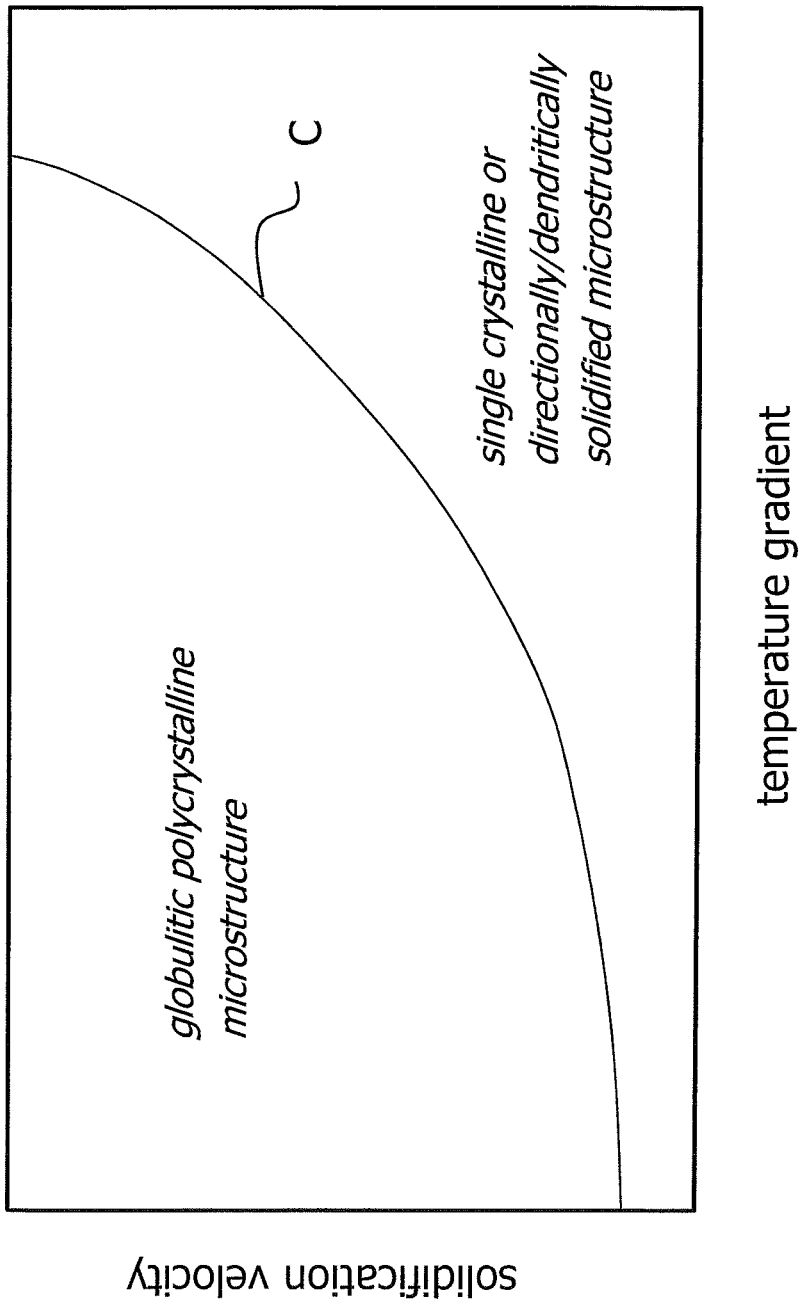

Preferred embodiments of the invention in the following are explained in greater detail with reference to the accompanying schematic drawings, in which:

FIG. 1 shows an apparatus for producing three-dimensional work pieces,

FIG. 2 shows, in schematic form, a v-G-diagram, wherein the solidification or crystal growth velocity v in a metallic melt is plotted against the temperature gradient G in the melt, FIG. 3a shows, in schematic form, a work piece produced by means of the apparatus according to FIG. 1, FIG. 3b shows an electron backscatter diffraction (EBSD) map illustrating the microstructure of a stainless steel 316L work piece according to FIG. 3a in an outer shell region thereof, FIG. 3c shows an electron backscatter diffraction (EBSD) map illustrating the microstructure of the stainless steel 316L work piece according to FIG. 3a in an inner core region thereof, and FIG. 3d shows an electron backscatter diffraction (EBSD) map illustrating the microstructure of the stainless steel 316L work piece according to FIG. 3a in a boundary region between the outer shell region and the inner core region thereof.

FIG. 1 shows an apparatus 10 for producing three-dimensional work pieces by selective laser melting (SLM®). The apparatus 10 comprises a process chamber 12 which may be sealed against the ambient atmosphere such that an inert gas atmosphere, for example an Argon atmosphere, may be established within the process chamber 12. A powder application device 14 serves to apply a raw material powder onto a carrier 16. The carrier 16 is designed to be displaceable in vertical direction so that, with increasing construction height of a work piece, as it is built up in layers from the raw material powder on the carrier 16, the carrier 16 can be moved downwards in the vertical direction.

The apparatus 10 further comprises an irradiation device 18 for selectively irradiating laser radiation onto the raw material powder applied onto the carrier 16. By means of the irradiation device 18, the raw material powder applied onto the carrier 18 may be subjected to laser radiation in a site-selective manner in dependence on the desired geometry of the work piece that is to be produced. The irradiation device 18 has a hermetically sealable housing 20. A laser beam 22 provided by a laser source 24 which may, for example, comprise a diode pumped Ytterbium fibre laser emitting laser light at a wavelength of approximately 1070 to 1080 nm is directed into the housing 20 via an opening 26. The irradiation device 18 further comprises an optical unit 28 for guiding and processing the laser beam 22, the optical unit 28 comprising optical elements such as a beam expander 30 for expanding the laser beam 22, a focusing lens 32 for focusing the laser beam 22 at a focus point, a scanner unit 34 and an object lens 36. The scanner unit 34 and the object lens 36 are shown by way of example in the form of a galvanometer scanner and an f-theta object lens. By means of the scanner unit 34, the position of the focus of the laser beam 22 both in the direction of the beam path and in a plane perpendicular to the beam path can be changed and adapted. For example, the irradiation device 18 may be an irradiation device as described in EP 2 335 848 A1.

In addition, the apparatus 10 comprises a heating device 37 for preheating the raw material powder prior to irradiating the laser beam 22 onto the raw material powder. Finally, the apparatus 10 comprises a control unit 38 which is adapted to control the operation of the powder application device 14 and the irradiation device 18 in dependence on the crystallization behavior of the raw material powder, in order to tailor the microstructure of a work piece made of said raw material powder by a additive layer construction method. The crystallization behavior of a metallic melt, may be described a v-G-diagram, which, in schematic form, is illustrated in FIG. 2. In the v-G-diagram, a solidification or crystal growth velocity v is plotted against the temperature gradient G, typically on a double logarithmic scale. A v-G-diagram may be measured or calculated for any desired material, as it is well known in the art. In the schematic v-G-diagram of FIG. 2, a curve C separates an areal region of the diagram, wherein the combination of high solidification or crystal growth velocities and low temperature gradients lead to the development of a polycrystalline globulitic microstructure, from an areal region of the diagram, wherein the combination of low solidification or crystal growth velocities and (local) undercooling of the melt due to high temperature gradients result in the formation of dendrites and single crystals.

The control unit 38 of the apparatus 10 thus is adapted to control the operation of the powder application device 14 and the irradiation device 18 in such a manner that, in dependence on the raw material powder type, a suitable combination of the solidification or crystal growth velocity and the temperature gradient occurring in the melt produced by irradiating the powder with the laser beam 22 is obtained in order to generate the desired microstructure, i.e. either a polycrystalline globulitic microstructure or a directionally solidified microstructure comprising substantially dendrites and/or single crystals.

Specifically, the control unit 38 is adapted to control the laser source 24 and the optical unit 28 so as to adjust different operating parameter of the laser source 24 and the optical unit 28 in dependence on the crystallization behavior of the raw material powder, in order to tailor the microstructure of a work piece made of said raw material powder by a additive layer construction method. The operating parameters of the laser source 24 and the optical unit 28 which may be controlled by means of the control unit 38 include a beam size, in particular a beam diameter, of the laser beam 22 irradiated onto the raw material powder applied onto the carrier 16 and a beam profile of a laser beam 22 irradiated onto the raw material powder applied onto the carrier 16.

For example, the beam size of the laser beam 22 may be increased under the control of the control unit 38 in order to promote the occurrence of a low solidification or crystal growth velocity in combination with a high temperature gradient in the melt produced by irradiating the powder and to thus obtain a substantially single crystalline or directionally/dendritically solidified microstructure in the generated work piece. Additionally or alternatively thereto, it is conceivable to promote the occurrence of a low solidification or crystal growth velocity in combination with a high temperature gradient in the melt and thus the formation of a substantially single crystalline or directionally/dendritically solidified microstructure in the generated work piece by changing the beam profile of the laser beam 22.

Further, the operating parameters of the laser source 24 and/or the optical unit 28 which may be controlled by means of the control unit 38 include a scan speed and/or a scan pattern of the laser beam 22. For example, the scan speed may be decreased under the control of the control unit 38 in order to promote the occurrence of a low solidification or crystal growth velocity in combination with a high temperature gradient in the melt produced by irradiating the powder and to thus obtain a substantially single crystalline or directionally/dendritically solidified microstructure in the generated work piece. Additionally or alternatively thereto, it is conceivable to promote the occurrence of a low solidification or crystal growth velocity in combination with a high temperature gradient in the melt and thus the formation of a substantially single crystalline or directionally/dendritically solidified microstructure in the generated work piece by increasing the distance between hatches along which the laser beam 22 is guided over the powder surface.

Finally, a laser power of the laser source 24 may be controlled by means of the control unit 38 in such a manner that, in dependence on the raw material powder type, a suitable combination of the solidification or crystal growth velocity and the temperature gradient occurring in the melt produced by irradiating the powder is obtained in order to generate the desired microstructure. Specifically, the laser power of the laser source 24 may be increased under the control of the control unit 38 in order to promote the occurrence of a low solidification or crystal growth velocity in combination with a high temperature gradient in the melt and thus the formation of a substantially single crystalline or directionally/dendritically solidified microstructure in the generated work piece.

The control unit 38 further is adapted to control the operation of the powder application device 14 so as to adjust a thickness of a raw material powder layer applied onto the carrier 16 in dependence on the crystallization behavior of the raw material powder, in order to tailor the microstructure of a work piece made of said raw material powder by a additive layer construction method. For example, the operation of the powder application device 14 may be controlled by the control unit 38 so as increase the thickness of the raw material powder layer applied onto the carrier, if it is desired to promote the occurrence of a low solidification or crystal growth velocity in combination with a high temperature gradient in the melt and thus the formation of a substantially single crystalline or directionally/dendritically solidified microstructure in the generated work piece.

Moreover, the control unit is adapted to control the heating device 37 so as to adjust a preheating temperature of the raw material powder in dependence on the crystallization behavior of the raw material powder, in order to tailor the microstructure of a work piece made of said raw material powder by a additive layer construction method.

EXAMPLE 1

A work piece 40 which is schematically depicted in FIG. 3a has been generated from a stainless steel (316L) powder having particle sizes of approximately 10 to 45 μm by a selective laser melting process using the apparatus 10 schematically illustrated in FIG. 1. The particle size of the stainless steel powder has been determined using laser diffraction. The particle size distribution has a substantially Gaussian-shaped profile, wherein the particle size of the smallest particles is approximately 10 μm and the particle size of the largest particles is approximately 45 μm. Particles which are smaller than 10 μm and/or particles which are larger than 45 μm may be present in the powder. However, the number of particles smaller than 10 μm and/or larger than 45 μm is low as compared to the number of particles having a size between 10 and 45 μm.

The operating parameters of the laser source 24, the optical unit 28, the powder application device 14 and the heating device 37 which have been set by means of the control unit 38 upon generating the work piece 40 are summarized in Table 1 below. The second line of Table 1 lists the operating parameters of the laser source 24, the optical unit 28, the powder application device 14 and the heating device 37 which have been set by means of the control unit 38 upon generating an outer shell region 42 of the work piece 40. The operating parameters of the laser source 24, the optical unit 28, the powder application device 14 and the heating device 37 which have been set by means of the control unit 38 upon generating an inner core region 44 of the work piece 40 are listed in the third line of Table 1.

TABLE 1

Operating parameters set for generating stainless steel (316 L) work piece

| | laser beam diameter | standardized laser power | standardized powder layer thickness | standardized scan speed | standardized hatch distance | preheating temperature |
|---|---|---|---|---|---|---|
| outer shell region | 90 μm | 0.37 | 0.33 | 1.67-2 | 0.2 | room temperature |
| inner core region | 750 μm | 2 | 0.67 | 0.65-0.75 | 1.17-1.33 | room temperature |

As becomes apparent from the EBSD map depicted in FIG. 3b, by suitable controlling the process parameters of the laser source 24, the optical unit 28, the powder application device 14 and the heating device 37 by means of the control unit 38, a polycrystalline globulitic microstructure has been generated in the work piece 40 in the outer shell region 42 thereof. Similarly, suitable controlling the process parameters of the laser source 24, the optical unit 28, the powder application device 14 and the heating device 37 by means of the control unit 38 lead to the formation of a substantially single crystalline or directionally/dendritically solidified microstructure in the inner core region 44 of the work piece 40, see the EBSD map depicted in FIG. 3c. The EBSD map of a boundary region between the outer shell region 42 and the inner core region 44 of the work piece 40, which is depicted in FIG. 3d, shows a clear interface between the substantially single crystalline or directionally/dendritically solidified microstructure in the inner core region 44 and the polycrystalline globulitic microstructure in the outer shell region 42 of the work piece 40.

The invention claimed is:

1. A method for producing three-dimensional work pieces, the method comprising the following steps:
    applying a raw material powder onto a carrier,
    selectively irradiating electromagnetic or particle radiation onto the raw material powder applied onto the carrier, and
    controlling the applying the raw material powder and the selectively irradiating electromagnetic or particle radiation onto the raw material powder in dependence on the crystallization behavior of the raw material powder, in order to obtain a combination of crystal growth velocity and temperature gradient associated with a desired microstructure of a work piece made of said raw material powder by an additive layer construction method.

2. The method according to claim 1, further comprising at least one of guiding and processing a radiation beam irradiated onto the raw material powder.

3. The method according to claim 2, further comprising adjusting at least one of:
    a beam size of a radiation beam irradiated onto the raw material powder applied onto the carrier,
    a beam profile of a radiation beam irradiated onto the raw material powder applied onto the carrier,
    a scan speed of a radiation beam irradiated onto the raw material powder applied onto the carrier,
    a scan pattern of a radiation beam irradiated onto the raw material powder applied onto the carrier, and
    an output of a radiation source
    in dependence on the crystallization behavior of the raw material powder, in order to tailor the microstructure of a work piece made of said raw material powder by an additive layer construction method.

4. The method according to claim 1, further comprising adjusting a thickness of the raw material powder layer applied onto the carrier in dependence on the crystallization behavior of the raw material powder, in order to tailor the microstructure of a work piece made of said raw material powder by an additive layer construction method.

5. The method according to claim 1, further comprising:
    preheating the raw material powder prior to irradiating electromagnetic or particle radiation onto the raw material powder, and
    adjusting a preheating temperature of the raw material powder in dependence on the crystallization behavior of the raw material powder, in order to tailor the microstructure of a work piece made of said raw material powder by an additive layer construction method.

6. The method according to claim 1, further comprising controlling the applying the raw material powder and the selectively irradiating electromagnetic or particle radiation onto the raw material powder in dependence on the crystallization behavior of the raw material powder, in order to differently tailor the microstructure of a work piece made of said raw material powder by an additive layer construction method in different regions of the work piece.

7. The method according to claim 1, further comprising controlling the applying the raw material powder and the selectively irradiating electromagnetic or particle radiation onto the raw material powder in dependence on the crystallization behavior of the raw material powder, in order to obtain a work piece made of said raw material powder by an additive layer construction, the work piece having a substantially polycrystalline globulitic microstructure in an outer shell region and a substantially single crystalline or directionally/dendritically solidified microstructure in an inner core region.

8. A method for producing a three-dimensional work piece, the method comprising:
    applying a raw material powder onto a carrier,
    selectively irradiating electromagnetic or particle radiation onto the raw material powder applied onto the carrier,
    controlling the applying the raw material powder and the selectively irradiating electromagnetic or particle radiation onto the raw material powder to obtain a combination of crystal growth velocity and temperature gradient associated with a desired microstructure of a work piece made of the raw material powder by an additive layer construction method, wherein controlling the applying the raw material powder and the selectively irradiating electromagnetic or particle radiation onto the raw material powder includes setting operating parameters of (i) a source of electromagnetic or particle radiation, (ii) an optical unit adapted to guide and/or process a radiation beam emitted by the source of electromagnetic or particle radiation, and (iii) a powder application device adapted to apply raw material powder onto the carrier to produce an outer shell region of the work piece that has a substantially polycrystalline globulitic microstructure, and setting operating parameters of (i) the source of electromagnetic or particle radiation, (ii) the optical unit, and (iii) the powder application device to produce an inner core region of the work piece that has a substantially single crystalline or directionally/dendritically solidified microstructure.

9. The method of claim 8, wherein the applying the raw material powder comprises applying raw material powder having particle sizes of approximately 10 to 45 micrometers.

10. The method of claim 8, wherein setting operating parameters of the source of electromagnetic or particle radiation, the optical unit, and the powder application device to produce the outer shell region of the work piece comprises:

setting a diameter of a radiation beam emitted by the source of electromagnetic or particle radiation to a first diameter value;

setting a scan speed of a scanner of the optical unit to a first speed value; and setting a thickness of the raw material powder applied by the powder application device to a first thickness value.

11. The method of claim 10, wherein setting operating parameters of the source of electromagnetic or particle radiation, the optical unit, and the powder application device to produce the inner core region of the work piece comprises:

setting a diameter of the radiation beam emitted by the source of electromagnetic or particle radiation to a second diameter value different from the first diameter value;

setting the scan speed of the scanner of the optical unit to a second speed value different from the first speed value; and setting the thickness of the raw material powder applied by the powder application device to a second thickness value different from the first thickness value.

12. The method of claim 11, wherein the second diameter value is 750 micrometers and the first diameter value is 90 micrometers.

13. The method of claim 12, wherein the second speed value is less than the first speed value.

14. The method of claim 13, wherein the second thickness value is greater than the first thickness value.

* * * * *